US007883740B2

(12) United States Patent
Nguyen et al.

(10) Patent No.: US 7,883,740 B2
(45) Date of Patent: Feb. 8, 2011

(54) LOW-QUALITY PARTICULATES AND METHODS OF MAKING AND USING IMPROVED LOW-QUALITY PARTICULATES

(75) Inventors: Philip D. Nguyen, Duncan, OK (US); Johnny A. Barton, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 1185 days.

(21) Appl. No.: 11/011,394

(22) Filed: Dec. 12, 2004

(65) Prior Publication Data
US 2006/0124303 A1 Jun. 15, 2006

(51) Int. Cl.
*B05D 7/00* (2006.01)
(52) U.S. Cl. .................. 427/212; 507/209; 507/924
(58) Field of Classification Search ............... 427/212; 507/209, 924
See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Schneider | 260/78.3 |
| 2,869,642 A | 1/1959 | McKay et al. | |
| 3,047,067 A | 7/1962 | Williams et al. | 166/33 |
| 3,052,298 A | 9/1962 | Malott | |
| 3,070,165 A | 12/1962 | Stratton | |
| 3,123,138 A | 3/1964 | Robichaux | 166/33 |
| 3,173,484 A | 3/1965 | Huitt et al. | |
| 3,176,768 A | 4/1965 | Brandt et al. | 166/33 |
| 3,195,635 A | 7/1965 | Fast | |
| 3,199,590 A | 8/1965 | Young | 166/33 |
| 3,272,650 A | 9/1966 | MacVittie | 134/7 |
| 3,297,086 A | 1/1967 | Spain | 166/33 |
| 3,302,719 A | 2/1967 | Fischer | |
| 3,308,885 A | 3/1967 | Sandiford | 166/33 |
| 3,308,886 A | 3/1967 | Evans | |
| 3,316,965 A | 5/1967 | Watanabe | 166/33 |
| 3,329,204 A | 7/1967 | Brieger | |
| 3,336,980 A | 8/1967 | Rike | 166/295 |
| 3,364,995 A | 1/1968 | Atkins et al. | |
| 3,366,178 A | 1/1968 | Malone et al. | |
| 3,375,872 A | 4/1968 | McLaughlin et al. | 166/29 |
| 3,378,074 A | 4/1968 | Kiel | |
| 3,404,735 A | 10/1968 | Young et al. | 166/33 |
| 3,415,320 A | 12/1968 | Young | 166/33 |
| 3,455,390 A | 7/1969 | Gallus | |
| 3,478,824 A | 11/1969 | Hess et al. | |
| 3,481,403 A | 12/1969 | Gidley et al. | |
| 3,489,222 A | 1/1970 | Millhone et al. | |
| 3,492,147 A | 1/1970 | Young et al. | 117/62.2 |
| 3,525,398 A | 8/1970 | Fisher | |
| 3,565,176 A | 2/1971 | Clifford | |
| 3,592,266 A | 7/1971 | Tinsley | |
| 3,659,651 A | 5/1972 | Graham | 166/280 |
| 3,681,287 A | 8/1972 | Brown et al. | 260/67 |
| 3,708,013 A | 1/1973 | Dismukes | 166/276 |
| 3,709,298 A | 1/1973 | Pramann | 166/276 |
| 3,741,308 A | 6/1973 | Veley | |
| 3,754,598 A | 8/1973 | Holloway, Jr. | 166/249 |
| 3,765,804 A | 10/1973 | Brandon | 417/540 |
| 3,768,564 A | 10/1973 | Knox et al. | 166/307 |
| 3,769,070 A | 10/1973 | Schilt | |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,842,911 A | 10/1974 | Knox et al. | 166/307 |
| 3,850,247 A | 11/1974 | Tinsley | |
| 3,854,533 A | 12/1974 | Gurley et al. | 166/276 |
| 3,857,444 A | 12/1974 | Copeland | 166/276 |
| 3,861,467 A | 1/1975 | Harnsberger | |
| 3,863,709 A | 2/1975 | Fitch | 165/1 |
| 3,868,998 A | 3/1975 | Lybarger et al. | 166/278 |

(Continued)

FOREIGN PATENT DOCUMENTS

CA 2063877 5/2003

(Continued)

OTHER PUBLICATIONS

Foreign Search Report and Written Opinion for Application No. PCT/GB2005/004010, Feb. 21, 2006.

(Continued)

*Primary Examiner*—Shamim Ahmed
(74) *Attorney, Agent, or Firm*—Robert A. Kent; McDermott Will & Emery LLP

(57) ABSTRACT

A method of treating a subterranean formation, comprising: at least partially coating particulates with a first layer of a first curable resin and allowing the first curable resin to substantially cure; and then, at least partially coating the particulates with a second layer of a second curable resin; and allowing the second layer of the second curable resin to substantially cure; and then, slurrying the coated particulates into a treatment fluid and placing the slurry into a subterranean formation. Improved particulates suitable for use in subterranean formations, comprising low-quality particulates that have been at least partially coated with a first layer of a first curable resin and then at least partially coated with a second layer of a second curable resin and wherein the first layer of the first curable resin is allowed to substantially cure before the application of the second layer of the second curable resin.

16 Claims, No Drawings

U.S. PATENT DOCUMENTS

| | | | |
|---|---|---|---|
| 3,888,311 A | 6/1975 | Cooke, Jr. | 166/280 |
| 3,912,692 A | 10/1975 | Casey et al. | 260/78.3 |
| 3,933,205 A | 1/1976 | Kiel | |
| 3,948,672 A | 4/1976 | Harnsberger | 106/90 |
| 3,955,993 A | 5/1976 | Curtice | 106/90 |
| 3,960,736 A | 6/1976 | Free et al. | 252/8.55 R |
| 4,000,781 A | 1/1977 | Knapp | |
| 4,008,763 A | 2/1977 | Lowe et al. | 166/253 |
| 4,015,995 A | 4/1977 | Hess | 106/287 |
| 4,018,285 A | 4/1977 | Watkins et al. | |
| 4,029,148 A | 6/1977 | Emery | 166/250.1 |
| 4,031,958 A | 6/1977 | Sandiford et al. | 166/270 |
| 4,042,032 A | 8/1977 | Anderson | 166/276 |
| 4,060,988 A | 12/1977 | Arnold | |
| 4,068,718 A | 1/1978 | Cooke, Jr. et al. | |
| 4,070,865 A | 1/1978 | McLaughlin | 61/36 |
| 4,074,760 A | 2/1978 | Copeland et al. | 166/276 |
| 4,085,801 A | 4/1978 | Sifferman | 166/295 |
| 4,085,802 A | 4/1978 | Sifferman et al. | |
| 4,089,437 A | 5/1978 | Chutter et al. | |
| 4,127,173 A | 11/1978 | Watkins et al. | 166/276 |
| 4,169,798 A | 10/1979 | DeMartino | 252/8.55 R |
| 4,172,066 A | 10/1979 | Zweigle et al. | 260/29.6 TA |
| 4,245,702 A | 1/1981 | Haafkens et al. | 166/307 |
| 4,247,430 A | 1/1981 | Constien | |
| 4,259,205 A | 3/1981 | Murphey | |
| 4,273,187 A | 6/1981 | Satter et al. | 166/250 |
| 4,291,766 A | 9/1981 | Davies et al. | 166/276 |
| 4,305,463 A | 12/1981 | Zakiewicz | 106/245 |
| 4,336,842 A | 6/1982 | Graham et al. | 166/276 |
| 4,352,674 A | 10/1982 | Fery | 23/230 |
| 4,353,806 A | 10/1982 | Canter et al. | 507/229 |
| 4,387,769 A | 6/1983 | Erbstoesser et al. | 166/295 |
| 4,392,988 A | 7/1983 | Dobson et al. | |
| 4,399,866 A | 8/1983 | Dearth | |
| 4,415,805 A | 11/1983 | Fertl et al. | 250/260 |
| 4,428,427 A | 1/1984 | Friedman | |
| 4,439,489 A | 3/1984 | Johnson et al. | 428/404 |
| 4,441,556 A | 4/1984 | Powers et al. | |
| 4,443,347 A | 4/1984 | Underdown et al. | 252/8.55 R |
| 4,460,052 A | 7/1984 | Gockel | 175/72 |
| 4,470,915 A | 9/1984 | Conway | 252/8.55 R |
| 4,493,875 A | 1/1985 | Beck et al. | 428/403 |
| 4,494,605 A | 1/1985 | Wiechel et al. | 166/288 |
| 4,498,995 A | 2/1985 | Gockel | 252/8.5 LC |
| 4,501,328 A | 2/1985 | Nichols | 166/288 |
| 4,526,695 A | 7/1985 | Erbstoesser et al. | 252/8.55 R |
| 4,527,627 A | 7/1985 | Graham et al. | 166/276 |
| 4,541,489 A | 9/1985 | Wu | 166/312 |
| 4,546,012 A | 10/1985 | Brooks | 427/213 |
| 4,553,596 A | 11/1985 | Graham et al. | 166/295 |
| 4,564,459 A | 1/1986 | Underdown et al. | 252/8.55 R |
| 4,572,803 A | 2/1986 | Yamazoe et al. | 534/16 |
| 4,585,064 A | 4/1986 | Graham et al. | 166/280 |
| 4,615,822 A * | 10/1986 | Magnus | 252/182.25 |
| 4,649,998 A | 3/1987 | Friedman | 166/294 |
| 4,664,819 A | 5/1987 | Glaze et al. | 252/8.551 |
| 4,665,988 A | 5/1987 | Murphey et al. | 166/295 |
| 4,669,543 A | 6/1987 | Young | 166/276 |
| 4,670,501 A | 6/1987 | Dymond et al. | |
| 4,675,140 A | 6/1987 | Sparks et al. | 264/4.3 |
| 4,681,165 A | 7/1987 | Bannister | |
| 4,683,954 A | 8/1987 | Walker et al. | 166/307 |
| 4,694,905 A | 9/1987 | Armbruster | 166/280 |
| 4,715,967 A | 12/1987 | Bellis | 252/8.551 |
| 4,716,964 A | 1/1988 | Erbstoesser et al. | 166/284 |
| 4,733,729 A | 3/1988 | Copeland | 166/276 |
| 4,739,832 A | 4/1988 | Jennings, Jr. et al. | 166/299 |
| 4,772,646 A | 9/1988 | Harms et al. | |
| 4,777,200 A | 10/1988 | Dymond et al. | |
| 4,785,884 A | 11/1988 | Armbruster | 166/280 |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/278 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/295 |
| 4,829,100 A | 5/1989 | Murphey et al. | 523/131 |
| 4,838,352 A | 6/1989 | Oberste-Padtberg et al. | 166/291 |
| 4,842,070 A | 6/1989 | Sharp | |
| 4,842,072 A | 6/1989 | Friedman et al. | 166/295 |
| 4,843,118 A | 6/1989 | Lai et al. | 524/555 |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,875,525 A | 10/1989 | Mana | |
| 4,886,354 A | 12/1989 | Welch et al. | 356/70 |
| 4,888,240 A | 12/1989 | Graham et al. | 428/403 |
| 4,892,147 A | 1/1990 | Jennings, Jr. et al. | |
| 4,895,207 A | 1/1990 | Friedman et al. | 166/276 |
| 4,898,750 A | 2/1990 | Friedman et al. | |
| 4,903,770 A | 2/1990 | Friedman et al. | 166/288 |
| 4,921,576 A | 5/1990 | Hurd | |
| 4,934,456 A | 6/1990 | Moradi-Araghi | 166/270 |
| 4,936,385 A | 6/1990 | Weaver et al. | 166/288 |
| 4,942,186 A | 7/1990 | Murphey et al. | 523/131 |
| 4,957,165 A | 9/1990 | Cantu et al. | 166/295 |
| 4,959,432 A | 9/1990 | Fan et al. | 526/287 |
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,980,229 A * | 12/1990 | Park et al. | 428/327 |
| 4,984,635 A | 1/1991 | Cullick et al. | |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,056,597 A | 10/1991 | Stowe, III et al. | |
| 5,082,056 A | 1/1992 | Tackett, Jr. | 166/295 |
| 5,095,987 A | 3/1992 | Weaver et al. | |
| 5,105,886 A | 4/1992 | Strubhar | 166/280 |
| 5,107,928 A | 4/1992 | Hilterhaus | 166/293 |
| 5,128,390 A | 7/1992 | Murphey et al. | 523/130 |
| 5,135,051 A | 8/1992 | Facteau et al. | 166/104 |
| 5,142,023 A | 8/1992 | Gruber et al. | 528/354 |
| 5,165,438 A | 11/1992 | Facteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,199,491 A | 4/1993 | Kutts et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Caabai et al. | 521/63 |
| 5,232,961 A | 8/1993 | Murphey et al. | 523/414 |
| 5,238,068 A | 8/1993 | Fredrickson | 166/307 |
| 5,244,362 A | 9/1993 | Conally et al. | |
| 5,247,059 A | 9/1993 | Gruber et al. | 528/354 |
| 5,249,628 A | 10/1993 | Surjaatmadia | 166/305 |
| 5,256,729 A | 10/1993 | Kutta et al. | 524/700 |
| 5,265,678 A | 11/1993 | Grundmann | |
| 5,273,115 A | 12/1993 | Spafford | 166/281 |
| 5,278,203 A | 1/1994 | Harms | |
| 5,285,849 A | 2/1994 | Surles et al. | 166/295 |
| 5,293,939 A | 3/1994 | Surles et al. | 166/295 |
| 5,295,542 A | 3/1994 | Cole et al. | 166/278 |
| 5,320,171 A | 6/1994 | Laramay | 166/285 |
| 5,321,062 A | 6/1994 | Landrum et al. | 523/141 |
| 5,325,923 A | 7/1994 | Surjaatmadja et al. | 166/308 |
| 5,330,005 A | 7/1994 | Card et al. | 166/280 |
| 5,332,037 A | 7/1994 | Schmidt et al. | 166/276 |

| | | | |
|---|---|---|---|
| 5,335,726 A | 8/1994 | Rodrogues .................. 166/295 |
| 5,351,754 A | 10/1994 | Hardin et al. ................ 166/249 |
| 5,358,051 A | 10/1994 | Rodrigues .................. 166/295 |
| 5,359,026 A | 10/1994 | Gruber ........................ 528/354 |
| 5,360,068 A | 11/1994 | Sprunt et al. ................ 166/259 |
| 5,361,856 A | 11/1994 | Surjaatmadja et al. ......... 175/67 |
| 5,363,916 A | 11/1994 | Himes et al. ................ 166/276 |
| 5,373,901 A | 12/1994 | Norman et al. .............. 166/300 |
| 5,377,756 A | 1/1995 | Northrop et al. |
| 5,377,759 A | 1/1995 | Surles ........................ 166/295 |
| 5,381,864 A | 1/1995 | Nguyen et al. ............... 166/280 |
| 5,386,874 A | 2/1995 | Laramay et al. ............. 166/300 |
| 5,388,648 A | 2/1995 | Jordan, Jr. ................... 166/380 |
| 5,390,741 A | 2/1995 | Payton et al. |
| 5,393,810 A | 2/1995 | Harris et al. .................. 524/56 |
| 5,396,957 A | 3/1995 | Surjaatmadja et al. ....... 166/308 |
| 5,402,846 A | 4/1995 | Jennings, Jr. et al. ........ 166/259 |
| 5,403,822 A | 4/1995 | Mueller et al. |
| 5,420,174 A | 5/1995 | Dewprashad |
| 5,422,183 A | 6/1995 | Sinclair et al. ............... 428/403 |
| 5,423,381 A | 6/1995 | Surles et al. ................. 166/295 |
| 5,439,055 A | 8/1995 | Card et al. ................... 166/280 |
| 5,460,226 A | 10/1995 | Lawson et al. ............... 166/300 |
| 5,464,060 A | 11/1995 | Hale et al. ................... 166/293 |
| 5,475,080 A | 12/1995 | Gruber et al. ................ 528/354 |
| 5,484,881 A | 1/1996 | Gruber et al. ................. 528/54 |
| 5,492,177 A | 2/1996 | Yeh et al. |
| 5,492,178 A | 2/1996 | Nguyen et al. |
| 5,494,103 A | 2/1996 | Surjaatmadja et al. ....... 166/222 |
| 5,494,178 A | 2/1996 | Maharg ....................... 166/276 |
| 5,497,830 A | 3/1996 | Boles et al. .................. 166/300 |
| 5,498,280 A | 3/1996 | Fistner et al. ................. 106/19 |
| 5,499,678 A | 3/1996 | Surjaatmadja et al. ....... 166/298 |
| 5,501,275 A | 3/1996 | Card et al. ................... 166/280 |
| 5,505,787 A | 4/1996 | Yamaguchi .................... 134/4 |
| 5,512,071 A | 4/1996 | Yam et al. ..................... 51/307 |
| 5,520,250 A | 5/1996 | Harry et al. .................. 166/276 |
| 5,522,460 A | 6/1996 | Shu ............................ 166/295 |
| 5,529,123 A | 6/1996 | Carpenter et al. ............ 166/293 |
| 5,531,274 A | 7/1996 | Bienvenu, Jr. ............... 166/280 |
| 5,536,807 A | 7/1996 | Gruber et al. ................ 528/354 |
| 5,545,824 A | 8/1996 | Stengel et al. ............... 524/590 |
| 5,547,023 A | 8/1996 | McDaniel et al. ........... 166/280 |
| 5,551,513 A | 9/1996 | Surles et al. ................. 166/278 |
| 5,551,514 A | 9/1996 | Nelson et al. ................ 166/280 |
| 5,582,249 A | 12/1996 | Caveny et al. ............... 166/276 |
| 5,582,250 A | 12/1996 | Constein ..................... 166/280 |
| 5,588,488 A | 12/1996 | Vijn et al. .................... 166/293 |
| 5,591,700 A | 1/1997 | Harris et al. ................. 507/204 |
| 5,594,095 A | 1/1997 | Gruber et al. ................ 528/354 |
| 5,595,245 A | 1/1997 | Scott, III ................. 166/250.1 |
| 5,597,784 A | 1/1997 | Sinclair et al. |
| 5,604,184 A | 2/1997 | Ellis et al. .................... 507/117 |
| 5,604,186 A | 2/1997 | Hunt et al. ................... 507/204 |
| 5,609,207 A | 3/1997 | Dewprashad et al. ........ 166/276 |
| 5,620,049 A | 4/1997 | Gipson et al. ............... 166/248 |
| 5,639,806 A | 6/1997 | Johnson et al. .............. 523/208 |
| 5,663,123 A | 9/1997 | Goodhue, Jr. et al. |
| 5,670,473 A | 9/1997 | Scepanski ................... 510/445 |
| 5,692,566 A | 12/1997 | Surles ........................ 166/295 |
| 5,697,440 A | 12/1997 | Weaver et al. ............... 166/281 |
| 5,697,448 A | 12/1997 | Johnson |
| 5,698,322 A | 12/1997 | Tsai et al. .................... 428/373 |
| 5,701,956 A | 12/1997 | Hardy et al. |
| 5,712,314 A | 1/1998 | Surles et al. .................. 521/41 |
| 5,732,364 A | 3/1998 | Kalb et al. ..................... 588/8 |
| 5,738,136 A | 4/1998 | Rosenberg |
| 5,765,642 A | 6/1998 | Surjaatmadja ............... 166/297 |
| 5,775,425 A | 7/1998 | Weaver et al. ............... 166/276 |
| 5,782,300 A | 7/1998 | James et al. .................. 166/278 |
| 5,783,822 A | 7/1998 | Buchanan et al. ........... 250/259 |
| 5,787,986 A | 8/1998 | Weaver et al. ............... 166/280 |
| 5,791,415 A | 8/1998 | Nguyen et al. ............... 166/280 |
| 5,799,734 A | 9/1998 | Norman et al. .............. 166/278 |
| 5,806,593 A | 9/1998 | Suries ........................ 166/270 |
| 5,830,987 A | 11/1998 | Smith ........................ 528/332 |
| 5,833,000 A | 11/1998 | Weaver et al. ............... 166/276 |
| 5,833,361 A | 11/1998 | Funk ............................ 366/80 |
| 5,836,391 A | 11/1998 | Jonasson et al. ............. 166/295 |
| 5,836,392 A | 11/1998 | Urlwin-Smith ............. 166/295 |
| 5,836,393 A | 11/1998 | Johnson |
| 5,837,656 A | 11/1998 | Sinclair et al. ............... 507/220 |
| 5,837,785 A | 11/1998 | Kinsho et al. ............... 525/527 |
| 5,839,510 A * | 11/1998 | Weaver et al. ............... 166/276 |
| 5,840,784 A | 11/1998 | Funkhouser et al. ........ 523/130 |
| 5,849,401 A | 12/1998 | El-Afandi et al. ........... 428/215 |
| 5,849,590 A | 12/1998 | Anderson, II et al. ......... 436/27 |
| 5,853,048 A | 12/1998 | Weaver et al. ............... 166/279 |
| 5,864,003 A | 1/1999 | Qureshi et al. |
| 5,865,936 A | 2/1999 | Edelman et al. ............. 156/310 |
| 5,871,049 A | 2/1999 | Weaver et al. ............... 166/276 |
| 5,873,413 A | 2/1999 | Chatterji et al. ............. 166/293 |
| 5,875,844 A | 3/1999 | Chatterji et al. ............. 166/293 |
| 5,875,845 A | 3/1999 | Chatterji et al. ............. 166/293 |
| 5,875,846 A | 3/1999 | Chatterji et al. ............. 166/293 |
| 5,893,383 A | 4/1999 | Facteau ........................ 137/14 |
| 5,893,416 A | 4/1999 | Read ........................... 166/304 |
| 5,901,789 A | 5/1999 | Donnelly et al. |
| 5,908,073 A | 6/1999 | Nguyen et al. ............... 166/276 |
| 5,911,282 A | 6/1999 | Onan et al. .................... 175/72 |
| 5,916,933 A | 6/1999 | Johnson et al. .............. 523/208 |
| 5,921,317 A | 7/1999 | Dewprashad et al. ........ 166/208 |
| 5,924,488 A | 7/1999 | Nguyen et al. ............... 166/280 |
| 5,929,437 A | 7/1999 | Elliott et al. ................. 250/259 |
| 5,944,105 A | 8/1999 | Nguyen ...................... 166/278 |
| 5,944,106 A | 8/1999 | Dalrymple et al. |
| 5,945,387 A | 8/1999 | Chatterji et al. ............. 507/224 |
| 5,948,734 A * | 9/1999 | Sinclair et al. ............... 507/219 |
| 5,955,144 A | 9/1999 | Sinclair et al. ............... 427/214 |
| 5,957,204 A | 9/1999 | Chatterji et al. ............. 166/295 |
| 5,960,784 A | 10/1999 | Ryan |
| 5,960,877 A | 10/1999 | Funkhouser et al. ........ 166/270 |
| 5,960,878 A | 10/1999 | Nguyen et al. |
| 5,960,880 A | 10/1999 | Nguyen et al. ............... 166/280 |
| 5,964,291 A | 10/1999 | Bourne et al. ................ 166/279 |
| 5,969,006 A | 10/1999 | Onan et al. ................... 523/166 |
| 5,969,823 A | 10/1999 | Wurz et al. |
| 5,977,283 A | 11/1999 | Rossitto |
| 5,994,785 A | 11/1999 | Higuchi et al. ............... 527/789 |
| RE36,466 E | 12/1999 | Nelson et al. ............... 166/280 |
| 6,003,600 A | 12/1999 | Nguyen et al. ............... 166/281 |
| 6,004,400 A | 12/1999 | Bishop et al. .................. 134/2 |
| 6,006,835 A | 12/1999 | Onan et al. ................... 166/295 |
| 6,006,836 A | 12/1999 | Chatterji et al. ............. 166/295 |
| 6,012,524 A | 1/2000 | Chatterji et al. ............. 166/295 |
| 6,016,870 A | 1/2000 | Dewprashad et al. ........ 166/295 |
| 6,024,170 A | 2/2000 | McCabe et al. ............. 166/300 |
| 6,028,113 A | 2/2000 | Scepanski .................... 514/643 |
| 6,028,534 A | 2/2000 | Ciglenec et al. ........... 340/856.2 |
| 6,040,398 A | 3/2000 | Kinsho et al. ............... 525/527 |
| 6,047,772 A | 4/2000 | Weaver et al. ............... 166/276 |
| 6,059,034 A | 5/2000 | Rickards et al. ............. 166/280 |
| 6,059,035 A | 5/2000 | Chatterji et al. ............. 166/293 |
| 6,059,036 A | 5/2000 | Chatterji et al. ............. 166/294 |
| 6,063,738 A | 5/2000 | Chatterji et al. |
| 6,068,055 A | 5/2000 | Chatterji et al. ............. 166/293 |
| 6,069,117 A | 5/2000 | Onan et al. ................... 507/202 |
| 6,070,667 A | 6/2000 | Gano |
| 6,074,739 A | 6/2000 | Katagiri ...................... 428/323 |
| 6,079,492 A | 6/2000 | Hoogteijling et al. |
| 6,098,711 A | 8/2000 | Chatterji et al. ............. 166/294 |
| 6,114,410 A | 9/2000 | Betzold ...................... 523/130 |
| 6,123,871 A | 9/2000 | Carroll .................... 252/301.36 |
| 6,123,965 A | 9/2000 | Jacon et al. .................. 424/489 |
| 6,124,246 A | 9/2000 | Heathman et al. ........... 507/219 |
| 6,130,286 A | 10/2000 | Thomas et al. |

| Patent | Kind | Date | Inventor | Class |
|---|---|---|---|---|
| 6,131,661 | A | 10/2000 | Conner et al. | |
| 6,135,987 | A | 10/2000 | Tsai et al. | 604/365 |
| 6,140,446 | A | 10/2000 | Fujiki et al. | |
| 6,143,698 | A | 11/2000 | Murphey et al. | |
| 6,148,911 | A | 11/2000 | Gipson et al. | 166/248 |
| 6,152,234 | A | 11/2000 | Newhouse et al. | 166/403 |
| 6,162,766 | A | 12/2000 | Muir et al. | 507/267 |
| 6,165,947 | A | 12/2000 | Chang et al. | |
| 6,169,058 | B1 | 1/2001 | Le et al. | 507/222 |
| 6,172,011 | B1 | 1/2001 | Card et al. | 507/204 |
| 6,172,077 | B1 | 1/2001 | Curtis et al. | 514/278 |
| 6,176,315 | B1 | 1/2001 | Reddy et al. | 166/295 |
| 6,177,484 | B1 | 1/2001 | Surles | 523/131 |
| 6,184,311 | B1 | 2/2001 | O'Keeffe et al. | 525/438 |
| 6,186,228 | B1 | 2/2001 | Wegener et al. | |
| 6,187,834 | B1 | 2/2001 | Thayer et al. | |
| 6,187,839 | B1 | 2/2001 | Eoff et al. | 523/130 |
| 6,189,615 | B1 | 2/2001 | Sydansk | 166/270 |
| 6,192,985 | B1 | 2/2001 | Hinkel et al. | 166/280 |
| 6,192,986 | B1 | 2/2001 | Urlwin-Smith | 166/295 |
| 6,196,317 | B1 | 3/2001 | Hardy | 166/295 |
| 6,202,751 | B1 | 3/2001 | Chatterji et al. | 166/276 |
| 6,209,643 | B1 | 4/2001 | Nguyen et al. | 166/276 |
| 6,209,644 | B1 | 4/2001 | Brunet | 166/297 |
| 6,209,646 | B1 | 4/2001 | Reddy et al. | 166/300 |
| 6,210,471 | B1 | 4/2001 | Craig | 106/31.08 |
| 6,214,773 | B1 | 4/2001 | Harris et al. | 507/271 |
| 6,231,664 | B1 | 5/2001 | Chatterji et al. | 106/724 |
| 6,234,251 | B1 | 5/2001 | Chatterji et al. | 166/295 |
| 6,238,597 | B1 | 5/2001 | Yim et al. | 252/512 |
| 6,241,019 | B1 | 6/2001 | Davidson et al. | 166/249 |
| 6,242,390 | B1 | 6/2001 | Mitchell et al. | 507/211 |
| 6,244,344 | B1 | 6/2001 | Chatterji et al. | 166/295 |
| 6,257,335 | B1 | 7/2001 | Nguyen et al. | 166/280 |
| 6,260,622 | B1 | 7/2001 | Blok et al. | 166/305.1 |
| 6,271,181 | B1 | 8/2001 | Chatterji et al. | 507/219 |
| 6,274,650 | B1 | 8/2001 | Cui | 523/457 |
| 6,279,652 | B1 | 8/2001 | Chatterji et al. | 166/194 |
| 6,279,656 | B1 | 8/2001 | Sinclair et al. | 166/310 |
| 6,283,214 | B1 | 9/2001 | Guinot et al. | 166/297 |
| 6,302,207 | B1 | 10/2001 | Nguyen et al. | 166/276 |
| 6,306,998 | B1 | 10/2001 | Kimura et al. | 528/12 |
| 6,310,008 | B1 | 10/2001 | Rietjens | |
| 6,311,773 | B1 | 11/2001 | Todd et al. | 166/280 |
| 6,315,040 | B1 | 11/2001 | Donnelly | |
| 6,321,841 | B1 | 11/2001 | Eoff et al. | 166/291 |
| 6,323,307 | B1 | 11/2001 | Bigg et al. | 528/354 |
| 6,326,458 | B1 | 12/2001 | Gruber et al. | 528/354 |
| 6,328,105 | B1 | 12/2001 | Betzold | 166/280 |
| 6,328,106 | B1 | 12/2001 | Griffith et al. | 166/295 |
| 6,330,916 | B1 | 12/2001 | Rickards et al. | 166/280 |
| 6,330,917 | B2 | 12/2001 | Chatterji et al. | 166/295 |
| 6,342,467 | B1 | 1/2002 | Chang et al. | |
| 6,350,309 | B2 | 2/2002 | Chatterji et al. | 106/677 |
| 6,357,527 | B1 | 3/2002 | Norman et al. | 166/300 |
| 6,364,018 | B1 | 4/2002 | Brannon et al. | 166/280.2 |
| 6,364,945 | B1 | 4/2002 | Chatterji et al. | 106/677 |
| 6,367,165 | B1 | 4/2002 | Huttlin | 34/582 |
| 6,367,549 | B1 | 4/2002 | Chatterji et al. | 166/292 |
| 6,372,678 | B1 | 4/2002 | Youngsman et al. | 504/128 |
| 6,376,571 | B1 | 4/2002 | Chawla et al. | |
| 6,387,986 | B1 | 5/2002 | Moradi-Araghi et al. | 523/211 |
| 6,390,195 | B1 | 5/2002 | Nguyen et al. | 166/276 |
| 6,394,181 | B2 | 5/2002 | Schnatzmeyer et al. | |
| 6,401,817 | B1 | 6/2002 | Griffith et al. | 166/295 |
| 6,405,796 | B1 | 6/2002 | Meyer et al. | |
| 6,405,797 | B2 | 6/2002 | Davidson et al. | 166/249 |
| 6,406,789 | B1 | 6/2002 | McDaniel et al. | 428/403 |
| 6,408,943 | B1 | 6/2002 | Schultz et al. | 166/285 |
| 6,415,509 | B1 | 7/2002 | Echols et al. | |
| 6,422,183 | B1 | 7/2002 | Kato | |
| 6,422,314 | B1 | 7/2002 | Todd et al. | 166/312 |
| 6,439,309 | B1 | 8/2002 | Matherly et al. | 166/276 |
| 6,439,310 | B1 | 8/2002 | Scott, III et al. | 166/308 |
| 6,440,255 | B1 | 8/2002 | Kohlhammer et al. | 156/283 |
| 6,446,727 | B1 | 9/2002 | Zemlak et al. | 166/308 |
| 6,448,206 | B1 | 9/2002 | Griffith et al. | 507/219 |
| 6,450,260 | B1 | 9/2002 | James et al. | 166/277 |
| 6,454,003 | B1 | 9/2002 | Chang et al. | 166/270 |
| 6,457,518 | B1 | 10/2002 | Castano-Mears et al. | |
| 6,458,885 | B1 | 10/2002 | Stengel et al. | 524/507 |
| 6,478,092 | B2 | 11/2002 | Voll et al. | |
| 6,485,947 | B1 | 11/2002 | Rajgarhia et al. | 435/139 |
| 6,488,091 | B1 | 12/2002 | Weaver et al. | |
| 6,488,763 | B2 | 12/2002 | Brothers et al. | 106/692 |
| 6,494,263 | B2 | 12/2002 | Todd | 166/312 |
| 6,503,870 | B2 | 1/2003 | Griffith et al. | 507/219 |
| 6,508,305 | B1 | 1/2003 | Brannon et al. | 166/293 |
| 6,510,896 | B2 | 1/2003 | Bode et al. | |
| 6,520,255 | B2 | 2/2003 | Tolman et al. | |
| 6,527,051 | B1 | 3/2003 | Reddy et al. | 166/300 |
| 6,528,157 | B1 | 3/2003 | Hussain et al. | 428/325 |
| 6,531,427 | B1 | 3/2003 | Shuchart et al. | 507/267 |
| 6,534,449 | B1 | 3/2003 | Gilmour et al. | |
| 6,536,939 | B1 | 3/2003 | Blue | |
| 6,538,576 | B1 | 3/2003 | Schultz et al. | 340/859.6 |
| 6,543,545 | B1 | 4/2003 | Chatterji et al. | 166/381 |
| 6,550,959 | B2 | 4/2003 | Huber et al. | |
| 6,552,333 | B1 | 4/2003 | Storm et al. | 250/269.3 |
| 6,554,071 | B1 | 4/2003 | Crook et al. | 166/293 |
| 6,555,507 | B2 | 4/2003 | Chatterji et al. | 507/219 |
| 6,569,814 | B1 | 5/2003 | Brady et al. | 507/201 |
| 6,582,819 | B2 | 6/2003 | McDaniel et al. | 428/402 |
| 6,588,926 | B2 | 7/2003 | Huber et al. | |
| 6,588,928 | B2 | 7/2003 | Huber et al. | |
| 6,593,402 | B2 | 7/2003 | Chatterji et al. | 524/7 |
| 6,599,863 | B1 | 7/2003 | Palmer et al. | 507/219 |
| 6,608,162 | B1 | 8/2003 | Chiu et al. | 528/129 |
| 6,609,578 | B2 | 8/2003 | Patel et al. | |
| 6,616,320 | B2 | 9/2003 | Huber et al. | |
| 6,620,857 | B2 | 9/2003 | Valet | 522/42 |
| 6,626,241 | B2 | 9/2003 | Nguyen | 166/278 |
| 6,632,527 | B1 | 10/2003 | McDaniel et al. | 428/402 |
| 6,632,778 | B1 | 10/2003 | Ayoub et al. | 507/202 |
| 6,632,892 | B2 | 10/2003 | Rubinsztajn et al. | 525/476 |
| 6,642,309 | B2 | 11/2003 | Komitsu et al. | |
| 6,648,501 | B2 | 11/2003 | Huber et al. | |
| 6,659,179 | B2 | 12/2003 | Nguyen | 166/227 |
| 6,664,343 | B2 | 12/2003 | Narisawa et al. | |
| 6,667,279 | B1 | 12/2003 | Hessert et al. | 507/225 |
| 6,668,926 | B2 | 12/2003 | Nguyen et al. | 166/280 |
| 6,669,771 | B2 | 12/2003 | Tokiwa et al. | 106/162.7 |
| 6,677,426 | B2 | 1/2004 | Noro et al. | |
| 6,681,856 | B1 | 1/2004 | Chatterji et al. | 166/294 |
| 6,686,328 | B1 | 2/2004 | Binder | 510/446 |
| 6,705,400 | B1 | 3/2004 | Nguyen et al. | 166/281 |
| 6,709,753 | B2 * | 3/2004 | Honda et al. | 428/447 |
| 6,710,019 | B1 | 3/2004 | Sawdon et al. | 507/136 |
| 6,713,170 | B1 | 3/2004 | Kaneka et al. | 428/323 |
| 6,725,926 | B2 | 4/2004 | Nguyen et al. | 166/254.1 |
| 6,725,930 | B2 | 4/2004 | Boney et al. | |
| 6,725,931 | B2 | 4/2004 | Nguyen et al. | 166/280.2 |
| 6,729,404 | B2 | 5/2004 | Nguyen et al. | 166/280.2 |
| 6,729,405 | B2 | 5/2004 | DiLullo et al. | |
| 6,732,800 | B2 | 5/2004 | Acock et al. | 166/308 |
| 6,745,159 | B1 | 6/2004 | Todd et al. | 703/10 |
| 6,749,025 | B1 | 6/2004 | Brannon et al. | 166/305.1 |
| 6,763,888 | B1 | 7/2004 | Harris et al. | 166/305.1 |
| 6,766,858 | B2 | 7/2004 | Nguyen et al. | 166/300 |
| 6,776,235 | B1 | 8/2004 | England | |
| 6,776,236 | B1 | 8/2004 | Nguyen | 166/279 |
| 6,832,650 | B2 | 12/2004 | Nguyen et al. | 166/279 |
| 6,832,655 | B2 | 12/2004 | Ravensbergen et al. | |
| 6,837,309 | B2 | 1/2005 | Boney et al. | |
| 6,851,474 | B2 | 2/2005 | Nguyen | 166/279 |
| 6,866,099 | B2 | 3/2005 | Nguyen | |

| | | |
|---|---|---|
| 6,881,709 B2 | 4/2005 | Nelson et al. |
| 6,887,834 B2 | 5/2005 | Nguyen et al. ............ 507/221 |
| 6,962,200 B2 | 11/2005 | Nguyen et al. |
| 6,978,836 B2 | 12/2005 | Nguyen et al. ............ 166/295 |
| 6,997,259 B2 | 2/2006 | Nguyen |
| 7,013,976 B2 | 3/2006 | Nguyen et al. |
| 7,017,665 B2 | 3/2006 | Nguyen |
| 7,025,134 B2 | 4/2006 | Byrd et al. |
| 7,032,667 B2 | 4/2006 | Nguyen et al. |
| 7,036,589 B2 | 5/2006 | Nguyen |
| 7,040,403 B2 | 5/2006 | Nguyen et al. |
| 7,059,406 B2 | 6/2006 | Nguyen |
| 7,063,150 B2 | 6/2006 | Slabaugh et al. |
| 7,066,258 B2 | 6/2006 | Justus et al. |
| 7,073,581 B2 | 7/2006 | Nguyen et al. |
| 7,080,688 B2 | 7/2006 | Todd et al. |
| 7,081,439 B2 | 7/2006 | Sullivan et al. |
| 7,093,658 B2 | 8/2006 | Chatterji et al. |
| 7,104,325 B2 | 9/2006 | Nguyen et al. |
| 7,114,560 B2 | 10/2006 | Nguyen et al. |
| 7,114,570 B2 | 10/2006 | Nguyen et al. |
| 7,117,942 B2 | 10/2006 | Dalrymple et al. |
| 7,131,491 B2 | 11/2006 | Blauch et al. |
| 7,153,575 B2 | 12/2006 | Anderson et al. |
| 7,156,194 B2 | 1/2007 | Nguyen |
| 7,178,596 B2 | 2/2007 | Blauch et al. |
| 7,204,311 B2 | 4/2007 | Welton et al. |
| 7,210,528 B1 | 5/2007 | Brannon et al. |
| 7,216,711 B2 | 5/2007 | Nguyen et al. |
| 7,273,099 B2 | 9/2007 | East, Jr. et al. |
| 7,281,581 B2 | 10/2007 | Nguyen et al. |
| 7,306,037 B2 | 12/2007 | Nguyen et al. |
| 2001/0016562 A1 | 8/2001 | Muir et al. ................. 507/201 |
| 2002/0036088 A1 | 3/2002 | Todd |
| 2002/0043370 A1 | 4/2002 | Poe ....................... 166/250.07 |
| 2002/0048676 A1 | 4/2002 | McDaniel et al. ........... 428/404 |
| 2002/0070020 A1 | 6/2002 | Nguyen ..................... 166/295 |
| 2002/0104217 A1 | 8/2002 | Echols et al. |
| 2002/0160920 A1 | 10/2002 | Dawson et al. |
| 2002/0169085 A1 | 11/2002 | Miller et al. |
| 2002/0189808 A1 | 12/2002 | Nguyen et al. |
| 2003/0006036 A1 | 1/2003 | Malone et al. .......... 166/250.12 |
| 2003/0013871 A1 | 1/2003 | Mallon et al. |
| 2003/0060374 A1 | 3/2003 | Cooke, Jr. ................. 507/200 |
| 2003/0106690 A1 | 6/2003 | Boney et al. |
| 2003/0114314 A1 | 6/2003 | Ballard et al. ............... 507/100 |
| 2003/0114317 A1 | 6/2003 | Benton et al. |
| 2003/0130133 A1 | 7/2003 | Vollmer ...................... 507/100 |
| 2003/0131999 A1 | 7/2003 | Nguyen et al. ............ 166/280 |
| 2003/0148893 A1 | 8/2003 | Lungofer et al. ........... 507/200 |
| 2003/0186820 A1 | 10/2003 | Thesing ...................... 507/200 |
| 2003/0188766 A1 | 10/2003 | Banerjee et al. ................. 134/7 |
| 2003/0188872 A1 | 10/2003 | Nguyen et al. ............ 166/308 |
| 2003/0196805 A1 | 10/2003 | Boney et al. ............... 166/280 |
| 2003/0205376 A1 | 11/2003 | Ayoub et al. ............. 166/254.2 |
| 2003/0224165 A1* | 12/2003 | Anderson et al. ........... 428/403 |
| 2003/0230408 A1 | 12/2003 | Acock et al. ................ 166/297 |
| 2003/0230431 A1 | 12/2003 | Reddy et al. |
| 2003/0234103 A1 | 12/2003 | Lee et al. .................... 166/293 |
| 2004/0000402 A1 | 1/2004 | Nguyen et al. ............ 166/280 |
| 2004/0014607 A1 | 1/2004 | Sinclair et al. ............. 507/200 |
| 2004/0014608 A1 | 1/2004 | Nguyen et al. ............. 507/200 |
| 2004/0040706 A1 | 3/2004 | Hossaini et al. ............ 166/278 |
| 2004/0040708 A1 | 3/2004 | Stephenson et al. ...... 166/280.1 |
| 2004/0040712 A1 | 3/2004 | Ravi et al. |
| 2004/0040713 A1 | 3/2004 | Nguyen et al. ............ 166/295 |
| 2004/0043906 A1 | 3/2004 | Heath et al. |
| 2004/0045712 A1 | 3/2004 | Eoff et al. |
| 2004/0048752 A1 | 3/2004 | Nguyen et al. ............. 507/269 |
| 2004/0055747 A1 | 3/2004 | Lee ............................ 166/278 |
| 2004/0060702 A1 | 4/2004 | Kotlar et al. |
| 2004/0106525 A1 | 6/2004 | Willbert et al. ............. 507/200 |
| 2004/0138068 A1 | 7/2004 | Rimmer et al. ............. 507/100 |
| 2004/0149441 A1 | 8/2004 | Nguyen et al. ........... 166/280.1 |
| 2004/0152601 A1 | 8/2004 | Still et al. ................... 507/100 |
| 2004/0152602 A1 | 8/2004 | Boles |
| 2004/0177961 A1 | 9/2004 | Nguyen .................... 166/280.2 |
| 2004/0194961 A1 | 10/2004 | Nguyen et al. ............ 166/295 |
| 2004/0206499 A1 | 10/2004 | Nguyen et al. ........... 166/280.2 |
| 2004/0211559 A1 | 10/2004 | Nguyen et al. ............ 166/276 |
| 2004/0211561 A1 | 10/2004 | Nguyen et al. ........... 166/280.2 |
| 2004/0221992 A1 | 11/2004 | Nguyen et al. ............ 166/295 |
| 2004/0231845 A1 | 11/2004 | Cooke, Jr. .................. 166/279 |
| 2004/0231847 A1 | 11/2004 | Nguyen et al. ............ 166/295 |
| 2004/0256097 A1 | 12/2004 | Byrd et al. |
| 2004/0256099 A1 | 12/2004 | Nguyen et al. ............ 166/249 |
| 2004/0261993 A1 | 12/2004 | Nguyen |
| 2004/0261995 A1 | 12/2004 | Nguyen et al. ............ 166/279 |
| 2004/0261997 A1 | 12/2004 | Nguyen et al. ............ 166/281 |
| 2004/0261999 A1 | 12/2004 | Nguyen |
| 2005/0000694 A1 | 1/2005 | Dalrymple et al. |
| 2005/0000731 A1 | 1/2005 | Nguyen et al. ................ 175/57 |
| 2005/0006093 A1 | 1/2005 | Nguyen et al. ............ 166/281 |
| 2005/0006095 A1 | 1/2005 | Justus et al. ................ 166/295 |
| 2005/0006096 A1 | 1/2005 | Nguyen et al. ............ 166/295 |
| 2005/0028976 A1 | 2/2005 | Nguyen |
| 2005/0028979 A1 | 2/2005 | Brannon et al. |
| 2005/0034862 A1 | 2/2005 | Nguyen ..................... 166/281 |
| 2005/0034865 A1 | 2/2005 | Todd et al. |
| 2005/0045326 A1 | 3/2005 | Nguyen ..................... 166/278 |
| 2005/0045330 A1 | 3/2005 | Nguyen et al. |
| 2005/0045384 A1 | 3/2005 | Nguyen |
| 2005/0051322 A1 | 3/2005 | Nguyen et al. |
| 2005/0051331 A1 | 3/2005 | Nguyen et al. ........... 166/280.2 |
| 2005/0059555 A1 | 3/2005 | Dusterhoft et al. |
| 2005/0061509 A1 | 3/2005 | Nguyen |
| 2005/0092489 A1 | 5/2005 | Welton et al. |
| 2005/0145385 A1 | 7/2005 | Nguyen |
| 2005/0173116 A1 | 8/2005 | Nguyen et al. |
| 2005/0194136 A1 | 9/2005 | Nguyen et al. |
| 2005/0194142 A1 | 9/2005 | Nguyen |
| 2005/0197258 A1 | 9/2005 | Nguyen |
| 2005/0263283 A1 | 12/2005 | Nguyen |
| 2005/0267001 A1 | 12/2005 | Weaver et al. |
| 2005/0269086 A1 | 12/2005 | Nguyen et al. |
| 2005/0269101 A1 | 12/2005 | Stegent et al. |
| 2005/0274510 A1 | 12/2005 | Nguyen et al. |
| 2005/0274517 A1 | 12/2005 | Blauch et al. |
| 2005/0277554 A1 | 12/2005 | Blauch et al. |
| 2005/0284632 A1 | 12/2005 | Dalrymple et al. |
| 2005/0284637 A1 | 12/2005 | Stegent et al. |
| 2006/0048943 A1 | 3/2006 | Parker et al. |
| 2006/0052251 A1 | 3/2006 | Anderson et al. |
| 2006/0113078 A1 | 6/2006 | Nguyen et al. |

FOREIGN PATENT DOCUMENTS

| | | |
|---|---|---|
| EP | 0313243 B1 | 10/1988 |
| EP | 0528595 A1 | 8/1992 |
| EP | 0506934 | 10/1992 |
| EP | 0510762 A2 | 11/1992 |
| EP | 0643196 A2 | 6/1994 |
| EP | 0834644 A2 | 4/1998 |
| EP | 0853186 A2 | 7/1998 |
| EP | 0864726 A2 | 9/1998 |
| EP | 0879935 B1 | 11/1998 |
| EP | 0933498 A1 | 8/1999 |
| EP | 1001133 A1 | 5/2000 |
| EP | 1132569 A2 | 9/2001 |
| EP | 1326003 A1 | 7/2003 |
| EP | 1362978 A1 | 11/2003 |
| EP | 1394355 A1 | 3/2004 |
| EP | 1396606 A2 | 3/2004 |
| EP | 1398640 A1 | 3/2004 |
| EP | 1403466 A2 | 3/2004 |
| EP | 1464789 A1 | 10/2004 |

| | | |
|---|---|---|
| GB | 1107584 | 3/1968 |
| GB | 1264180 | 12/1969 |
| GB | 1292718 | 10/1972 |
| GB | 2298440 | 9/1996 |
| GB | 2382143 A | 4/2001 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 01/81914 | 11/2001 |
| WO | WO 01/87797 A1 | 11/2001 |
| WO | WO 02/12674 A1 | 2/2002 |
| WO | WO 03/027431 A1 | 4/2003 |
| WO | WO 2004/009956 | 1/2004 |
| WO | WO 2004/037946 A1 | 5/2004 |
| WO | WO 2004/038176 A1 | 5/2004 |
| WO | WO 2004/083600 | 9/2004 |
| WO | WO2004090281 | 10/2004 |
| WO | WO2004104368 | 12/2004 |
| WO | WO 2005/021928 A2 | 3/2005 |

OTHER PUBLICATIONS

S. W. Almond, et al., "*Factors Affecting Proppant Flowback With Resin Coated Proppants*," Society of Petroleum Engineers, Inc., SPE 30096, p. 171-186, 1995.
U.S. Appl. No. 10/383,154, filed Mar. 6, 2003, Nguyen, et al.
U.S. Appl. No. 10/394,898, filed Mar. 21, 2003, Eoff et al.
U.S. Appl. No. 10/408,800, filed Apr. 7, 2003, Nguyen, et al.
U.S. Appl. No. 10/601,407, filed Jun. 23, 2003, Byrd et al.
U.S. Appl. No. 10/603,492, filed Jun. 25, 2003, Nguyen, et al.
U.S. Appl. No. 10/649,029, filed Aug. 27, 2003, Nguyen, et al.
U.S. Appl. No. 10/650,063, filed Aug. 26, 2003, Nguyen.
U.S. Appl. No. 10/650,064, filed Aug. 26, 2003, Nguyen, et al.
U.S. Appl. No. 10/650,065, filed Aug. 26, 2003, Nguyen.
U.S. Appl. No. 10/659,574, filed Sep. 10, 2003, Nguyen, et al.
U.S. Appl. No. 10/727,365, filed Dec. 4, 2003, Reddy, et al.
U.S. Appl. No. 10/751,593, filed Jan. 5, 2004, Nguyen.
U.S. Appl. No. 10/775,347, filed Feb. 10, 2004, Nguyen.
U.S. Appl. No. 10/791,944, filed Mar. 3, 2004, Nguyen.
U.S. Appl. No. 10/793,711, filed Mar. 5, 2004, Nguyen, et al.
U.S. Appl. No. 10/852,811, filed May 25, 2004, Nguyen.
U.S. Appl. No. 10/853,879, filed May 26, 2004, Nguyen et al.
U.S. Appl. No. 10/860,951, filed Jun. 4, 2004, Stegent, et al.
U.S. Appl. No. 10/861,829, filed Jun. 4, 2004, Stegent, et al.
U.S. Appl. No. 10/862,986, filed Jun. 8, 2004, Nguyen, et al.
U.S. Appl. No. 10/864,061, filed Jun. 9, 2004, Blauch, et al.
U.S. Appl. No. 10/864,618, filed Jun. 9, 2004, Blauch, et al.
U.S. Appl. No. 10/868,593, filed Jun. 15, 2004, Nguyen, et al.
U.S. Appl. No. 10/868,608, filed Jun. 15, 2004, Nguyen, et al.
U.S. Appl. No. 10/937,076, filed Sep. 9, 2004, Nguyen, et al.
U.S. Appl. No. 10/944,973, filed Sep. 20, 2004, Nguyen, et al.
U.S. Appl. No. 10/972,648, filed Oct. 25, 2004, Dusterhoft, et al.
U.S. Appl. No. 10/977,673, filed Oct. 29, 2004, Nguyen.
U.S. Appl. No. 11/009,277, filed Dec. 8, 2004, Welton, et al.
U.S. Appl. No. 11/011,394, filed Dec. 12, 2004, Nguyen, et al.
U.S. Appl. No. 11/035,833, filed Jan. 14, 2005, Nguyen.
U.S. Appl. No. 11/049,252, filed Feb. 2, 2005, Van Batenburg, et al.
U.S. Appl. No. 11/053,280, filed Feb. 8, 2005, Nguyen.
U.S. Appl. No. 11/056,635, filed Feb. 11, 2005, Dusterhoft, et al.
Halliburton, *CoalStim*[SM] *Service, Helps Boost Cash Flow From CBM Assets*, Stimulation, HO3679 10/03, 2003, Halliburton Communications.
Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications.
Halliburton, *Expedite® Service, A Step-Change Improvement Over Conventional Proppant Flowback Control Systems. Provides Up to Three Times the Conductivity of RCPs.*, Stimulation, HO3296 05/04, 2004, Halliburton Communications.
Halliburton Technical Flier—Multi Stage Frac Completion Methods, 2 pages.
Halliburton "*CobraFrac*[SM] *Service, Coiled Tubing Fracturing—Cost-Effective Method for Stimulating Untapped Reserves*", 2 pages, 2004.
Halliburton "*CobraJetFrac*[SM] *Service, Cost-Effective Technology That Can Help Reduce Cost per BOE Produced, Shorten Cycle time and Reduce Capex*".
Halliburton Cobra Frac Advertisement, 2001.
Halliburton "*SurgiFrac*[SM] *Service, a Quick and cost-Effective Method to Help Boost Production From Openhole Horizonal Completions*", 2002.
Halliburton, *SandWedge® NT Conductivity Enhancement System, Enhances Proppant Pack Conductivity and Helps Prevent Intrusion of Formation Material for Improved Long-Term Production*, Stimulation, HO2289 05/04, 2004, Halliburton Communications.
Almond et al., *Factors Affecting Proppant Flowback With Resin Coated Proppants*, SPE 30096, pp. 171-186, May 1995.
Nguyen et al., *A Novel Approach for Enhancing Proppant Consolidation: Laboratory Testing and Field Applications*, SPE Paper No. 77748, 2002.
SPE 15547, *Field Application of Lignosulfonate Gels To Reduce Channeling*, South Swan Hills Miscible Unit, Alberta, Canada, by O.R. Wagner et al., 1986.
Owens et al., *Waterflood Pressure Pulsing for Fractured Reservoirs* SPE 1123, 1966.
Felsenthal et al., *Pressure Pulsing—An Improved Method of Waterflooding Fractured Reservoirs* SPE 1788, 1957.
Raza, "*Water and Gas Cyclic Pulsing Method for Improved Oil Recovery*", SPE 3005, 1971.
Peng et al., "*Pressure Pulsing Waterflooding in Dual Porosity Naturally Fractured Reservoirs*" SPE 17587, 1988.
Dusseault et al, "*Pressure Pulse Workovers in Heavy Oil*", SPE 79033, 2002.
Yang et al., "*Experimental Study on Fracture Initiation by Pressure Pulse*", SPE 63035, 2000.
Nguyen et al., *New Guidelines For Applying Curable Resin-Coated Proppants*, SPE Paper No. 39582, 1997.
Kazakov et al., "*Optimizing and Managing Coiled Tubing Frac Strings*" SPE 60747, 2000.
Advances in Polymer Science, vol. 157, "*Degradable Aliphatic Polyesters*" edited by A.-C. Alberston, 2001.
Gorman, *Plastic Electric: Lining up the Future of Conducting Polymers* Science News, vol. 163, May 17, 2003.
Gidley et al., "*Recent Advances in Hydraulic Fracturing*," Chapter 6, pp. 109-130, 1989.
Simmons et al., "*Poly(phenyllactide): Synthesis, Characterization, and Hydrolytic Degradation, Biomacromolecules*", vol. 2, No. 2, pp. 658-663, 2001.
Yin et al., "*Preparation and Characterization of Substituted Polylactides*", Americal Chemical Society, vol. 32, No. 23, pp. 7711-7718, 1999.
Yin et al., "Synthesis and Properties of Polymers Derived from Substituted Lactic Acids", American Chemical Society, Ch.12, pp. 147-159, 2001.
Cantu et al., "*Laboratory and Field Evaluation of a Combined Fluid-Loss Control Additive and Gel Breaker for Fracturing Fluids*," SPE 18211, 1990.
Love et al., "*Selectively Placing Many Fractures in Openhole Horizontal Wells Improves Production*", SPE 50422, 1998.
McDaniel et al. "*Evolving New Stimulation Process Proves Highly Effective In Level 1 Dual-Lateral Completion*" SPE 78697, 2002.
Albertsson et al.,"*Aliphatic Polyesters: Synthesis, Properties and Applications*", Advances in Polymer Science, vol. 57 Degradable Aliphatic Polyesters, 2002.
Dechy-Cabaret et al., "*Controlled Ring-Operated Polymerization of Lactide and Glycolide*" American Chemical Society, Chemical Reviews, A-Z, AA-AD, 2004.
Funkhouser et al., "*Synthetic Polymer Fracturing Fluid for High-Temperature Applications*", SPE 80236, 2003.

*Chelating Agents*, Encyclopedia of Chemical Technology, vol. 5 (764-795).

Vichaibun et al., "*A New Assay for the Enzymatic Degradation of Polylactic Acid, Short Report*", ScienceAsia, vol. 29, pp. 297-300, 2003.

CDX Gas, CDX Solution, 2003, CDX, LLC, Available @ www.cdxgas.com/solution.html, printed pp. 1-2.

CDX Gas, "*What is Coalbed Methane?*" CDX, LLC. Available @ www.cdxgas.com/what.html, printed page 1.

Halliburton brochure entitled "H2Zero™ Service Introducing The Next Generation of cost-Effective Conformance Control Solutions", 2002.

Halliburton brochure entitled " "INJECTROL® A Component:, 1999.

Halliburton brochure entitled "INJECTROL® G Sealant", 1999.

Halliburton brochure entitled "INJECTROL® IT Sealant", 1999.

Halliburton brochure entitled "INJECTROL® Service Treatment", 1999.

Halliburton brochure entitled "INJECTROL® U Sealant", 1999.

Halliburton brochure entitled "Sanfix® A Resin", 1999.

Halliburton brochure entitled "Pillar Frac Stimulation Technique" Fracturing Services Technical Data Sheet, 2 pages.

Foreign search report and opinion (CPW 21582 EP), Mar. 11, 2005.

U.S. Appl. No. 12/080,647, filed Apr. 4, 2008, Dalrymple et al.

"Santrol Bioballs"; http://www.fairmounminerals.com/.sub.--SANTROL/SANTROL%20Web%20Site/B.sub- .--TD.htm. cited by other, Sep. 30, 2004.

International Search Report and Opinion (PCT/GB2004/002412), Sep. 16, 2004.

International Search Report and opinion (PCT/GB2004/003845), Jul. 31, 2006.

International Search Report and Opinion (PCT/GB2004/001497), Jul. 20, 2004.

International Search Report and Opinion (PCT/GB2004/001842), Oct. 12, 2004.

International Search Report and Opinion (PCT/GB2004/002674), Dec. 16, 2004.

International Search Report and Opinion (PCT/GB2004/002968), Nov. 16, 2004.

International Search Report and Opinion (PCT/GB2004/004242), Oct. 2, 2005.

International Search Report and Opinion (PCT/GB2004-000689), Jun, 4, 2004.

International Search Report and Opinion (PCT/GB2004/002727), Mar. 11, 2005.

International Search Report and Opinion (PCT/GB2004/002747), Mar. 11, 2005.

International Search Report and Opinion (PCT/GB2007/002273), Sep. 3, 2007.

International Search Report and Opinion (PCT/GB2004/002948), May 24, 2005.

Paccaloni, et al., "Key Factors for Enhanced Results of Matrix Stimulation Treatments," SPE 17154, Feb. 1988.

Paccaloni, et al., "Advances in Matrix Stimulation Technology," SPE 20623, Mar. 1993.

Nguyen, et al., Controlling Proppant Flowback in High-Temperature, High-Production Wells, SPE 82215, May 2003.

Dusterhoft, et al., "Maximizing Effective Proppant Permeability Under High-Stress, High Gas-Rate Conditions," SPE 90398, Sep. 2004.

Russian Examination Report for Patent Application No. 2007126479, dated Nov. 26, 2009.

Examination Report for Australian Patent Application No. 2005313226 dated Jun. 8, 2010.

* cited by examiner

LOW-QUALITY PARTICULATES AND METHODS OF MAKING AND USING IMPROVED LOW-QUALITY PARTICULATES

BACKGROUND OF THE INVENTION

The present invention relates to improved low-quality particulates, to methods for improving low-quality particulates, and to methods of using improved low-quality particulates in hydraulic fracturing, frac packing, and gravel packing treatments.

Hydrocarbon-producing wells are often stimulated by hydraulic fracturing treatments. In hydraulic fracturing treatments, a viscous fracturing fluid is pumped into a producing zone at a rate and pressure such that the subterranean formation breaks down and one or more fractures are formed in the zone. Particulate solids, such as graded sand, which are often referred to as "proppant" are suspended in a portion of the fracturing fluid and then deposited in the fractures when the fracturing fluid is converted to a thin fluid to be returned to the surface. These particulates serve, inter alia, to prevent the fractures from fully closing so that conductive channels are formed through which produced hydrocarbons can flow.

Hydrocarbon-producing wells may also undergo gravel packing treatments to reduce the migration of unconsolidated formation particulates into the well bore. In gravel packing operations, particulates, often referred to in the art as gravel, are carried to a well bore in a subterranean producing zone by a servicing fluid that acts as a gravel carrier fluid. That is, the particulates are suspended in a carrier fluid, which may be and usually is viscosified, and the carrier fluid is pumped into a well bore in which the gravel pack is to be placed. As the particulates are placed in or near the zone, the carrier fluid leaks off into the subterranean zone and/or is returned to the surface. The resultant gravel pack acts as a sort of filter to prevent the production of the formation solids with the produced fluids. Traditional gravel pack operations involve placing a gravel pack screen in the well bore before packing the surrounding annulus between the screen and the well bore with gravel. The gravel pack screen is generally a filter assembly used to support and retain the gravel placed during the gravel pack operation. A wide range of sizes and screen configurations is available to suit the characteristics of a well bore, the production fluid, and any particulates in the subterranean formation. Gravel packs are used, among other reasons, to stabilize the formation while causing minimal impairment to well productivity.

In some situations, hydraulic fracturing and gravel packing operations may be combined into a single treatment. Such treatments are often referred to as "frac pack" operations. In some cases, the treatments are completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

To prevent the subsequent flow-back of proppant, gravel, and other particulates with the produced fluids, a portion of the particulates introduced into a subterranean formation may be coated with a curable resin that may facilitate the consolidation the particulates in the fracture. A variety of resin-coated proppant materials have been used in modern hydraulic fracturing treatments. These include graded natural materials, such as sand or nut shells, or constructed materials, such as bauxite, ceramic materials, glass materials, polymer beads, composite particles, and the like. Most common of these are high-quality graded natural sands, such as Ottawa sand. Unfortunately, high quality sands such as these are in short supply and are becoming increasingly costly. Lower quality sands could be used; however, proppant packs composed of lower-quality sands (even those coated with curable resins using traditional coating techniques) often contain large amounts of fines, and typically have lower conductivities and are generally more susceptible to proppant crushing, making them inadequate for most fracturing treatments.

SUMMARY OF THE INVENTION

The present invention relates to improved low-quality particulates, to methods for improving low-quality particulates, and to methods of using improved low-quality particulates in hydraulic fracturing, frac packing, and gravel packing treatments.

One embodiment of the present invention provides a method of improving the quality of particulates comprising: providing particulates; at least partially coating the particulates with a first layer of a first curable resin and allowing the first layer of the first curable resin to substantially cure; and then, at least partially coating the particulates with a second layer of a second curable resin; and allowing the second layer of the second curable resin to substantially cure.

Another embodiment of the present invention provides a method of treating a portion of a subterranean formation, comprising: providing particulates; at least partially coating the particulates with a first layer of a first curable resin and allowing the first layer of the first curable resin to substantially cure; and then, at least partially coating the particulates with a second layer of a second curable resin; and allowing the second layer of the second curable resin to substantially cure; and then, slurrying the coated particulates into a treatment fluid and placing the slurry into a portion of a subterranean formation.

Another embodiment of the present invention provides improved particulates suitable for use in subterranean formations, comprising low-quality particulates that have been at least partially coated with a first layer of a first curable resin and then at least partially coated with a second layer of a second curable resin and wherein the first layer of the first curable resin is allowed to substantially cure before the application of the second layer of the second curable resin.

The features and advantages of the present invention will be readily apparent to those skilled in the art upon a reading of the description of the preferred embodiments that follows.

DESCRIPTION OF PREFERRED EMBODIMENTS

The present invention relates to improved low-quality particulates, to methods for improving low-quality particulates, and to methods of using improved low-quality particulates in hydraulic fracturing, frac packing, and gravel packing treatments.

In accordance with the teachings of the present invention, particulates (such as proppant or gravel) may be coated with two or more layers of curable resin to improve the quality of the particulates. In some of the methods of the present invention, once a coating of curable resin is applied it is allowed to substantially cure before a next layer of curable resin is added. By coating the particulates in such a manner, the particulates may be altered to exhibit higher crush resistance, lower angularity, and/or to produce fewer fines when exposed to a crushing force. In particular embodiments, the improved particulates may also offer the ability to rebond and provide adequate consolidation strength for forming a stationary, permeable particulate pack (such as a gravel pack or a proppant pack).

Some embodiments of the present invention are particularly well-suited for use with low quality particulates. As used herein, the term "low-quality particulates" refers to particulates that do not meet at least one of the standards for sphericity, roundness, size, turbidity, acid solubility, percentage of fines, or crush resistance as recited in American Petroleum Institute Recommended Practices (API RP) standard numbers 56 and 58 for proppant and gravel respectively.

API RP numbers 56 and 58 describe the minimum standard for sphericity as at least 0.6 and for roundness as at least 0.6. As used herein, the terms "sphericity" and "roundness" are defined as described in the API RP's and can be determined using the procedures set forth in the API RP's.

API RP 56 also sets forth some commonly recognized proppant sizes as 6/12, 8/16, 12/20, 20/40, 30/50, 40/70, and 70/140 (all values expressed as U.S. Mesh). Similarly, API RP 58 also sets forth some commonly recognized gravel sizes as 8/16, 12/20, 16/30, 20/40, 30/50, and 40/60 (all values expressed as U.S. Mesh). The API RP's further note that a minimum percentage of particulates that should fall between designated sand sizes and that not more than 0.1 weight % of the particulates should be larger than the larger sand size and not more than a maximum percentage (1 weight % in API RP 56, and 2 weight % in API RP 58) should be smaller than the small sand size. Thus, for 20/40 proppant, no more than 0.1 weight % should be larger than 20 U.S. Mesh and no more than 1 weight % smaller than 40 U.S. Mesh.

API RP's 56 and 58 describe the minimum standard for proppant and gravel turbidity as 250 FTU or less. API RP 56 describes the minimum standard for acid solubility of proppant as no more than 2 weight % loss when tested according to API RP 56 procedures for proppant sized between 6/12 Mesh and 30/50 Mesh, U.S. Sieve Series and as no more than 3 weight % loss when tested according to API RP 56 procedures for proppant sized between 40/70 Mesh and 70/140 Mesh, U.S. Sieve Series. API RP 58 describes the minimum standard for acid solubility of gravel as no more than 1 weight % loss when tested according to API RP 58 procedures. API RP 56 describes the minimum standard for crush resistance of proppant as producing not more than the suggested maximum fines as set forth in Table 1, below, for the size being tested:

TABLE 1

Suggested Maximum Fines for Proppant Subjected to Crushing Strength

| Mesh Size (U.S. Sieve Series) | Crushing Force (lbs) | Stress on Proppant (psi) | Maximum Fines (% by weight) |
| --- | --- | --- | --- |
| 6/12 | 6,283 | 2,000 | 20 |
| 8/16 | 6,283 | 2,000 | 18 |
| 12/20 | 9,425 | 3,000 | 16 |
| 16/30 | 9,425 | 3,000 | 14 |
| 20/40 | 12,566 | 4,000 | 14 |
| 30/50 | 12,566 | 4,000 | 10 |
| 40/70 | 15,708 | 5,000 | 8 |
| 70/140 | 15,708 | 5,000 | 6 |

Similarly, API RP 58 describes the minimum standard for crush resistance of gravel as producing not more than the suggested maximum fines as set forth in Table 2, below, for the size being tested:

TABLE 2

Suggested Maximum Fines for Gravel Subjected to Crushing Strength

| Mesh Size (U.S. Sieve Series) | Crushing Force (lbs) | Stress on Proppant (psi) | Maximum Fines (% by weight) |
| --- | --- | --- | --- |
| 8/16 | 6,283 | 2,000 | 8 |
| 12/20 | 6,283 | 2,000 | 4 |
| 16/30 | 6,283 | 2,000 | 2 |
| 20/40 | 6,283 | 2,000 | 2 |
| 30/50 | 6,283 | 2,000 | 2 |
| 40/60 | 6,283 | 2,000 | 2 |

By coating the particulates with two or more layers of resin and allowing that resin to substantially cure, the methods of the present invention are able to transform otherwise unsuitable particulates into particulates suitable for use in subterranean operations. By way of example, in cases wherein the particulate to be coated is too angular and does not meet standards for roundness and/or sphericity, some known methods of coating such a particulate with resin may act to produce a more round and/or spherical coated particulate. Moreover, many times a subterranean operation takes place at a location wherein particulates are readily available, but are too small to be suitable for use in the particular subterranean operation; in such a case, repeated coatings of resin may be used to increase the size of the individual particulates to a desired size. In addition, coating an acid-resistant resin onto a particulate that otherwise has too high of an acid solubility may act to transform an otherwise unsuitable particulate into a suitable one. Resin coating may also help transform particulates from sources having an overly abundant percentage of fines into a suitable material due to the fact that the fines may tend to become entrapped in a portion of resin that then is coated onto a more suitable size particulate. Turbidity is (at least in part) an indication of the percentage of fines present in a suspension. Thus, as described above, the ability of the resins coatings to reduce the level of fines may also act to reduce the level of turbidity. Similarly, much of readily available sand has insufficient strength to be suitable for use in withstanding crushing force in a fracturing or gravel packing operation, but once that sand is coated with at least two layers of cured resin its ability to withstand a crushing force may be enhanced. Moreover, since the sand has been coated with resin, if any of the particulates are crushed it is less likely that pieces of crushed particulate will end up loose in the formation because the crushed pieces may be bound in the resin layers.

Particulates suitable for use in the present invention may be comprised of any material suitable for use in subterranean operations. Suitable particulate materials include, but are not limited to, sand; bauxite; ceramic materials; glass materials; polymer materials; polytetrafluoroethylene (such as materials sold under the trademark Teflon®); nut shell pieces; seed shell pieces; cured resinous particulates comprising nut shell pieces; cured resinous particulates comprising seed shell pieces; fruit pit pieces; cured resinous particulates comprising fruit pit pieces; wood; composite particulates and combinations thereof. Composite particulates may also be suitable, suitable composite materials may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. It should be understood that the term "particulate," as used in this disclosure, includes all known shapes of materials including substantially spherical materials, fibrous materials, polygonal materials (such as cubic materials) and mixtures thereof. Moreover, fibrous materials that may or may not be used to bear the pressure of a closed fracture, are often included in proppant and gravel treatments. As mentioned above, in some embodiments of the present invention, low quality particulates, such as some sands naturally occurring at or near a well site, may be preferred.

Curable resins suitable for use in the present invention include, but are not limited to, two-component epoxy based resin; phenol-aldehydes; epoxies; urea-aldehydes; furfuryl alcohol; melamine-aldehydes; polyesters; alkyds; novolac; furan resins; combinations of phenolic resin and furan resin; terpolymers of a phenol, furfuryl alcohol, and an aldehyde; mixtures of a phenol-formaldehyde resole resin and a latent curing agent (further described in U.S. Pat. No. 5,864,003); partially reacted blends of an aliphatic polyester and a trifunctional isocyanate (further described in U.S. Pat. No. 5,977,283); acrylic polyols cured with polyisocyanate compounds (further described in U.S. Pat. No. 6,130,286); mixtures of an organo-pilysiloxane compound and a platinum catalyst (further described in U.S. Pat. No. 6,140,446); mixtures of a diorganopolysiloxane end-blocked with a hydroxyl group, an organic compound having a C=O group, an organic compound having a $NH_2$ group, and a hydrolyzable silane having at least one of the following functional groups: ketoxime, alkoxy, acyloxy, amide, amino, or a partial hydrolyzate thereof (further described in U.S. Pat. No. 6,306,998); acrylic modified silyl-terminated polyether resin compositions (further described in U.S. Pat. No. 6,642,309); phenolic resins containing 70-97% by weight phenolic resin and 3-30% by weight of a silicone-based rubber component (further described in U.S. Pat. No. 6,664,343). The relevant disclosures of U.S. Pat. Nos. 5,864,003, 5,977,283, 6,130,286, 6,140,446, 6,306,998, 6,642,309, and 6,664,343, are hereby incorporated by reference. Suitable two-component epoxy based resins generally comprise a hardenable resin component and a hardening agent component wherein the hardenable resin component comprises a hardenable resin and (optionally) a solvent and wherein the liquid hardening agent component comprises a hardening agent, a silane coupling agent, a surfactant, (optionally) a hydrolyzable ester, and (optionally) an solvent.

While any curable resin may be used, in some embodiments of the present invention, a relatively fast-curing resin may be desirable.

In the methods improving low-quality particulates of the present invention, particulates are at least partially coated with a first layer of a curable resin. Typically, for the first layer of curable resin, the particulates are coated with a curable resin in the about of from about 0.1% to about 4% by weight of the particulates. A variety of methods exist for coating the particulates with a curable resin. One suitable method uses auger action via a sand screw. Additional examples of some suitable coating methods and devices may be found in U.S. Pat. Nos. 6,616,320 and 6,648,501, the relevant disclosure of which is hereby incorporated by reference.

After the particulates have been at least partially coated with a first layer of a curable resin, the curable resin is allowed to substantially cure. In particular embodiments of the present invention, allowing the resin to cure comprises exposing the coated proppant to a curing source, such as heat (from a rotary kiln, convention oven, conventional oven, etc.), microwaves (see U.S. Pat. No. 6,079,492 the relevant disclosure of which is hereby incorporated by reference), or ultraviolet light (see U.S. Pat. Nos. 6,187,834 and 6,376,571 the relevant disclosures of which are hereby incorporated by reference). In other embodiments the curable resin may need only time to cure. In other embodiments the curable resin may be exposed to an external chemical catalyst to trigger or speed curing. The exact method of curing selected may depend on the particular curable resin selected, and the amount of time allowed for curing. One of ordinary skill in the art, with the benefit of this disclosure, should be able to select an adequate method of curing the resin.

After the first layer of a curable resin has been allowed to substantially cure, the resin-coated particulates may be disaggregated to separate any clusters of particulates that may have formed from the individual particulate grains. Disaggregating the particulates helps prepare the particulates for a next layer of curable resin and reduces the formation of particulate clumps or clusters. A number of methods may be used to disaggregate the particulates. One suitable method comprises tumbling and sieving the resin-coated particulates.

After the first layer of a curable resin has been allowed to substantially cure, the particulates may be at least partially coated with a second layer of a curable resin. Typically, the particulates are coated with the second curable resin in the about of from about 0.1% to about 4% by weight of the particulates. Typically, the second layer of curable resin substantially covers the first layer. In particular embodiments, the first and second layers of curable resin may comprise the same resin. In other embodiments of the present invention, the first and second layers of curable resin may be different resins.

After the second layer of a curable resin has been applied to the particulates, the second curable resin may be allowed to substantially cure, as described above in regard to the curing of the first layer of the first curable resin. After this curing, the particulates may again be disaggregated to separate any particulate clusters that may have formed, similar to process previously described.

In particular embodiments, additional layers of curable resin may also be applied to the particulates of the present invention, further improving the quality of the particulates. These additional layers of curable resin may be the same resins as those applied in the first and/or the second coatings, or may be a different resin. As with the first and second coatings of curable resin, the particulate grains are typically disaggregated between individual coatings of curable resin, as previously described.

In some embodiments of the present invention the curable resin may be coated onto the particulates on-the-fly such that the particulates are coated with a resin, the resin is cured and at least one other coating of resin is applied and allowed to cure, all on-the-fly during the operation in which the coated particulates are to be used. In other embodiments, one or more coatings of resin may be applied and allowed to substantially cure and then only the last or only the last couple of coatings applied on-the-fly at the well site. As will be readily recognized by one skilled in the art, the last coating of resin onto the proppant need not be fully cured before being used in a subterranean operation. Rather, it can be left to complete curing while being transported and/or once placed into a desired location within the subterranean formation. In fact, in some embodiments it is desirable for the final coating of resin to remain at least partially uncured until placed into a desired location within the subterranean formation so that the particulates have a tendency to consolidate. Such embodiments generally incorporate the use of coating methods that allow for on-the-fly production (such as auger action sand screws) and fast curing resins such as those described above.

Once coated with curable resin, the proppant of the present invention may be suspended in a treatment fluid and introduced into a subterranean formation. Generally, any treatment fluid suitable for a fracturing, graveling packing, or frac-packing application may be used in accordance with the teachings of the present invention, including aqueous gels, viscoelastic surfactant gels, oil gels, foamed gels and emulsions. Suitable aqueous gels are generally comprised of water and one or more gelling agents. Suitable emulsions can be comprised of two immiscible liquids such as an aqueous liquid or gelled liquid and a hydrocarbon. Foams can be created by the addition of a gas, such as carbon dioxide or nitrogen. In exemplary embodiments of the present invention, the fracturing fluids are aqueous gels comprised of water, a gelling agent for gelling the water and increasing its viscosity, and, optionally, a crosslinking agent for crosslinking the gel and further increasing the viscosity of the fluid. The increased viscosity of the gelled, or gelled and cross-linked, treatment fluid, inter alia, reduces fluid loss and allows the fracturing fluid to transport significant quantities of suspended proppant particles. The water used to form the treatment fluid may be fresh water, salt water, brine, sea water, or any other aqueous liquid that does not adversely react with the other components. The density of the water can be increased to provide additional particle transport and suspension in the present invention.

A variety of gelling agents may be used, including hydratable polymers that contain one or more functional groups such as hydroxyl, carboxyl, sulfate, sulfonate, amino, or amide groups. Suitable gelling typically comprise polymers, synthetic polymers, or a combination thereof. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain exemplary embodiments, the gelling agents may be polymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, and cellulose derivatives, such as hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued Dec. 3, 2002 to Weaver, et al., the relevant disclosure of which is incorporated herein by reference. Suitable gelling agents generally are present in the viscosified treatment fluids of the present invention in an amount in the range of from about 0.1% to about 5% by weight of the water therein. In certain exemplary embodiments, the gelling agents are present in the viscosified treatment fluids of the present invention in an amount in the range of from about 0.01% to about 2% by weight of the water therein.

Crosslinking agents may be used to crosslink gelling agent molecules to form crosslinked gelling agents. Crosslinkers typically comprise at least one ion that is capable of crosslinking at least two gelling agent molecules. Examples of suitable crosslinkers include, but are not limited to, boric acid, disodium octaborate tetrahydrate, sodium diborate, pentaborates, ulexite and colemanite, compounds that can supply zirconium IV ions (such as, for example, zirconium lactate, zirconium lactate triethanolamine, zirconium carbonate, zirconium acetylacetonate, zirconium malate, zirconium citrate, and zirconium diisopropylamine lactate); compounds that can supply titanium IV ions (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. An example of a suitable commercially available zirconium-based crosslinker is "CL-24" available from Halliburton Energy Services, Inc., Duncan, Okla. An example of a suitable commercially available titanium-based crosslinker is "CL-39" available from Halliburton Energy Services, Inc., Duncan Okla. Suitable crosslinkers generally are present in the viscosified treatment fluids of the present invention in an amount sufficient to provide, inter alia, the desired degree of crosslinking between gelling agent molecules. In certain exemplary embodiments of the present invention, the crosslinkers may be present in an amount in the range from about 0.001% to about 10% by weight of the water in the fracturing fluid. In certain exemplary embodiments of the present invention, the crosslinkers may be present in the viscosified treatment fluids of the present invention in an amount in the range from about 0.01% to about 1% by weight of the water therein. Individuals skilled in the art, with the benefit of this disclosure, will recognize the exact type and amount of crosslinker to use depending on factors such as the specific gelling agent, desired viscosity, and formation conditions.

The gelled or gelled and cross-linked treatment fluids may also include internal delayed gel breakers such as enzyme, oxidizing, acid buffer, or temperature-activated gel breakers. The gel breakers cause the viscous treatment fluids to revert to thin fluids that can be produced back to the surface after they have been used to place proppant particles in subterranean fractures. The gel breaker used is typically present in the treatment fluid in an amount in the range of from about 0.5% to about 10% by weight of the gelling agent. The treatment fluids may also include one or more of a variety of well-known additives, such as gel stabilizers, fluid loss control additives, clay stabilizers, bactericides, and the like.

Therefore, the present invention is well adapted to attain the ends and advantages mentioned as well as those that are inherent therein. While numerous changes may be made by those skilled in the art, such changes are encompassed within the spirit of this invention as defined by the appended claims.

What is claimed is:

1. A method of improving the quality of particulates for use in a subterranean operation comprising:
   providing low-quality particulates;
   at least partially coating the particulates with a first layer of a first curable resin and allowing the first layer of the first curable resin to cure; and then
   at least partially coating the particulates with a second layer of a second curable resin on-the-fly; and allowing the second layer of the second curable resin to cure to create twice-coated low-quality particulates;
   wherein the first curable resin comprises at least one of the following: a partially reacted blend of an aliphatic polyester and a trifunctional isocyanate; an acrylic polyol cured with a polyisocyanate compound; a mixture of an organo-pilysiloxane compound and a platinum catalyst; a mixture of a diorganopolysiloxane end-blocked with a hydroxyl group, an organic compound having a C=O group, an organic compound having a NH₂ group, and a hydrolyzable silane having at least one of the following functional groups: ketoxime, alkoxy, acyloxy, amide, amino, or a partial hydrolyzate thereof; and an acrylic modified silyl-terminated polyether resin composition;

using the twice-coated low-quality particulates in a subterranean treatment operation.

2. The method of claim 1 wherein the first layer of the first curable resin is coated onto the particulates in an amount ranging from about 0.1% by weight to about 4% by weight of the particulates.

3. The method of claim 1 further comprising the step of, after allowing the second layer of the second curable resin to cure, at least partially coating the particulates having a second layer of a second curable resin thereon with a third layer of a third curable resin.

4. The method of claim 1 wherein the second curable resin comprises at least one of the following: a partially reacted blend of an aliphatic polyester and a trifunctional isocyanate; an acrylic polyol cured with a polyisocyanate compound; a mixture of an organo-pilysiloxane compound and a platinum catalyst; a mixture of a diorganopolysiloxane end-blocked with a hydroxyl group, an organic compound having a C=O group, an organic compound having a NH₂ group, and a hydrolyzable silane having at least one of the following functional groups: ketoxime, alkoxy, acyloxy, amide, amino, or a partial hydrolyzate thereof; an acrylic modified silyl-terminated polyether resin composition; or, a phenolic resin containing 70-97% by weight phenolic resin and 3-30% by weight of a silicone-based rubber component.

5. The method of claim 1 further comprising disaggregating the particulates before the step of at least partially coating the particulates with a second layer of a second curable resin.

6. The method of claim 1 further comprising disaggregating the proppant material after the step of allowing the second layer of the second curable resin to cure.

7. The method of claim 1 wherein the low-quality particulates comprise at least one of the following: sand; bauxite; ceramic materials; glass materials; polymer materials; polytetrafluoroethylene materials; nut shell pieces; seed shell pieces; cured resinous particulates comprising nut shell pieces; cured resinous particulates comprising seed shell pieces; fruit pit pieces; cured resinous particulates comprising fruit pit pieces; wood; or composite particulates.

8. The method of claim 1 wherein the first layer of the first curable resin or the second layer of the second curable resin is exposed to at least one of the following to help it cure heat, microwave, ultraviolet light, or an external chemical catalyst.

9. The method of claim 1 wherein the first layer of the first curable resin is applied on-the-fly.

10. The method of claim 3 wherein the third layer of the third curable resin is applied on-the-fly.

11. A method of treating a portion of a subterranean formation comprising:

providing low-quality particulates;

at least partially coating the particulates with a first layer of a first curable resin and allowing the first layer of the first curable resin to cure wherein the first curable resin comprises at least one of the following: a partially reacted blend of an aliphatic polyester and a trifunctional isocyanate; an acrylic polyol cured with a polyisocyanate compound; a mixture of an organo-pilysiloxane compound and a platinum catalyst; a mixture of a diorganopolysiloxane end-blocked with a hydroxyl group, an organic compound having a C=O group, an organic compound having a NH₂ group, and a hydrolyzable silane having at least one of the following functional groups: ketoxime, alkoxy, acyloxy, amide, amino, or a partial hydrolyzate thereof; and an acrylic modified silyl-terminated polyether resin composition; and then, at least partially coating the particulates with a second layer of a second curable resin on-the-fly; and allowing the second layer of the second curable resin to cure to create twice-coated particulates; and then, slurrying the twice-coated particulates into a treatment fluid and placing the slurry into a portion of a subterranean formation.

12. The method of claim 11 wherein the first layer of the first curable resin is coated onto the particulates in an amount ranging from about 0.1% by weight to about 4% by weight of the particulates.

13. The method of claim 11 further comprising the step of, after allowing the second layer of the second curable resin to cure, at least partially coating the particulates having a second layer of a second curable resin thereon with a third layer of a third curable resin.

14. The method of claim 11 wherein the second curable resin comprises at least one of the following: a partially reacted blend of an aliphatic polyester and a trifunctional isocyanate; an acrylic polyol cured with a polyisocyanate compound; a mixture of an organo-pilysiloxane compound and a platinum catalyst; a mixture of a diorganopolysiloxane end-blocked with a hydroxyl group, an organic compound having a C=O group, an organic compound having a NH₂ group, and a hydrolyzable silane having at least one of the following functional groups: ketoxime, alkoxy, acyloxy, amide, amino, or a partial hydrolyzate thereof; an acrylic modified silyl-terminated polyether resin composition; or, a phenolic resin containing 70-97% by weight phenolic resin and 3-30% by weight of a silicone-based rubber component.

15. The method of claim 1 wherein the second layer of the second curable resin is coated onto the particulates in an amount ranging from about 0.1% by weight to about 4% by weight of the particulates.

16. The method of claim 11 wherein the second layer of the second curable resin is coated onto the particulates in an amount ranging from about 0.1% by weight to about 4% by weight of the particulates.

* * * * *